(12) United States Patent
Horiuchi

(10) Patent No.: US 7,477,329 B2
(45) Date of Patent: Jan. 13, 2009

(54) STRUCTURE FOR FIXING ELECTRICAL APPARATUS SUCH AS TELEVISION AND METHOD OF FIXING ELECTRICAL APPARATUS

(75) Inventor: Yasuo Horiuchi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1064 days.

(21) Appl. No.: 10/808,602

(22) Filed: Mar. 25, 2004

(65) Prior Publication Data

US 2004/0246387 A1 Dec. 9, 2004

(30) Foreign Application Priority Data

Mar. 26, 2003 (JP) ............................. 2003-084170

(51) Int. Cl.
*H04N 5/645* (2006.01)
*H05K 7/14* (2006.01)
*F16M 13/00* (2006.01)

(52) U.S. Cl. ....................... 348/839; 348/825; 248/918; 361/681

(58) Field of Classification Search ................ 348/552, 348/825, 826, 836, 838, 839; 248/346.03, 248/346.05, 346.06, 918, 919; 361/679–673, 361/724–726, 728–730; 312/7.2, 223.6; 174/535, 542; 242/121, 170, 398, 176.1
See application file for complete search history.

(56) References Cited

U.S. PATENT DOCUMENTS

| | | | | |
|---|---|---|---|---|
| 4,155,452 A | * | 5/1979 | Wettermann et al. | 206/512 |
| 4,809,393 A | * | 3/1989 | Goodrich et al. | 15/323 |
| 5,393,025 A | * | 2/1995 | Franklin | 248/317 |
| 5,710,600 A | * | 1/1998 | Ishii et al. | 348/563 |
| 6,206,318 B1 | * | 3/2001 | Glass | 242/400.1 |
| 6,371,582 B1 | * | 4/2002 | Hasegawa | 312/223.3 |
| 6,597,567 B2 | * | 7/2003 | Stone et al. | 361/683 |
| 2004/0227860 A1 | * | 11/2004 | DePaolo et al. | 348/825 |

FOREIGN PATENT DOCUMENTS

| | | |
|---|---|---|
| JP | 05-068220 | 3/1993 |
| JP | 09-037192 | 2/1997 |
| JP | 09-154656 | 6/1997 |

\* cited by examiner

*Primary Examiner*—Victor R Kostak
(74) *Attorney, Agent, or Firm*—Crowell & Moring LLP

(57) ABSTRACT

To fix a TV 10 (electrical apparatus to be mounted) having a power cord 12 (insulated electric wire) to a DVD player 20 (mounting object) when the TV 10 is placed on the DVD player 20, the DVD player 20 is provided with a hook member 23 around which the power cord 12 can be securely wound. Accordingly, the TV 10 can be easily fixed to the DVD 20 by utilizing the power cord 12 of the TV 10, without requiring an additional member such as a belt, for thereby effectively preventing the TV 10 from falling down in the event of an accident such as an earthquake.

28 Claims, 13 Drawing Sheets

STRUCTURE FOR FIXING ELECTRICAL APPARATUS SUCH AS TELEVISION AND METHOD OF FIXING ELECTRICAL APPARATUS

BACKGROUND OF THE INVENTION

1. Field of the Invention

The present invention relates to a structure for fixing an electrical apparatus such as a television to a mounting body on which the electrical apparatus is placed, and a method of fixing an electrical apparatus to a mounting body when the electrical apparatus is placed on the mounting body.

2. Description of Related Art

As conventional techniques for preventing a television resting on a mounting body from falling down in the event of an accident such as an earthquake, the following are known.

A technique disclosed in JP-A-09-154656 is such that a supporting member is disposed on a back face of a television while a belt holder is fixed to an upper portion of a back face of a television mounting table. When a television is placed on the television mounting table, a belt is caught by or attached to the supporting member and then retained by the belt holder.

Another technique disclosed in JP-A-09-037191 is such that a band insertion hole is formed in a back face of a television, and when a television is placed on a rack, a fitting portion of a band is inserted into the hole and then the band is secured with a screw to an upper portion of a back face of the rack.

Further another technique disclosed in JP-A-05-068220 is such that an anchor part of a buckle is fixed to an upper portion of a back face of a stand while a receiver part for receiving the anchor part is fixed to a back face of a television, and when the television is placed on the stand, the anchor part is inserted into and locked to the receiver part.

Further, in some cases, a television having a size of about 19 inches or smaller is directly placed on an electrical apparatus such as a video cassette recorder or DVD player, for saving space.

SUMMARY OF THE INVENTION

According to the above-described conventional techniques, a television is fixed to the television mounting table or other bodies for use with the television. Therefore, in a case where the television is directly placed on another electrical apparatus, the television can not be fixed to the electrical apparatus. In addition, the conventional techniques require the belt, band or buckle as an additional member. Thus, there has been a request for preventing the television from falling down in the event of an accident such as an earthquake, by fixing the television to a mounting body such as an electrical apparatus on which the television is placed, without using such an additional member.

This invention has been developed in view of the above-described situations. Therefore, an object of the invention is to provide a structure for, and method of, fixing an electrical apparatus such as a television, which makes it possible to easily fix an electrical apparatus such as a television on a mounting body without requiring an additional member such as a belt.

To attain the above object, a first aspect of the invention provides a structure for fixing a television to a mounting body when the television is placed on the mounting body, for preventing the television from falling down when a vibration is imposed upon the television, the television having: a cabinet; and a power cord a shape of which in cross section is noncircular and which has a equipment end fixed to the cabinet and extends substantially backward from the cabinet, wherein the mounting body is an electrical apparatus on which the television is to be placed, wherein the electrical apparatus has a recessed portion on an edge formed by a bottom face and a back face of the electrical apparatus, and a pair of hook members each of which extends substantially downward from the recessed portion, and around which the power cord is securely wound, the pair of hook members having respective horizontal extensions which extend from respective lower ends of the hook members practically horizontally and substantially opposite directions, so that the power cord securely wound around the pair of hook members is prevented from falling away from the pair of hook members by the presence of the horizontal extensions, the horizontal extensions having respective prongs which extend substantially upward from respective ends of the horizontal extensions, wherein there are two first intervals each of which is defined in a substantially vertical direction by an upper end of each of the prongs and the recessed portion, a length of each first interval being shorter than a maximum dimension of the cross section of the power cord and longer than a minimum dimension of the cross section of the power cord, wherein there are two second intervals each of which is defined in a substantially vertical direction by a lower end of each of the prongs and the recessed portion, a length of each second interval being longer than the maximum dimension of the cross section of the power cord, and wherein the power cord is securely wound around the pair of hook members by being inserted from the first intervals into the respectively corresponding second intervals, so that the television is fixed to the electrical apparatus on which the television is placed.

When a television is placed on the electrical apparatus, the power cord is inserted from the first intervals into the respectively corresponding second intervals, with the power cord oriented such that a direction of the minimum dimension is substantially vertical. After thus inserted, the orientation of the power code is changed such that a direction of the maximum dimension is substantially vertical. In this state, the power cord is not able to come through the first interval, i.e., between the each prong and the recessed portion. Thus, the power cord is inhibited from coming off from the hook members and can be securely wound around the hook members, by inserting the power code from the first intervals between the prongs and the recessed portion into the respectively corresponding second intervals between the horizontal extensions and the recessed portion.

Since each of the hook members extends in the direction away from the television, the power cord is inhibited from coming off from the hook members. When the power cord securely wound around the hook members is moved downward, the power cord eventually reaches the horizontal extensions and become unable to move any further, thereby is prevented from falling away from the hook members.

Further, when the power cord moves toward the end of each extension, the power cord eventually reaches the prong extending substantially upward from the end of the extension and is made unable to move any further, and thereby is prevented from falling away from the hook members, again.

Once the power cord extending from the cabinet of the television is securely wound around the pair of hook members, the television is fixed to the electrical apparatus as a mounting body having the hook members. That is, the television can be easily fixed to the electrical apparatus as a mounting body by utilizing the power cord of the television, eliminating the necessity of providing an additional member such as a belt, band or buckle. Thus, the television is prevented from falling down in the event of an accident such as an earthquake.

In the above description, the term that "(the power cord) extends substantially backward from the cabinet" means that the power cord may extend obliquely backward, as well as strictly backward. The term that the hook member "extends substantially downward" means that the hook member may extend obliquely downward, as well as strictly downward. The term "practically horizontally" implies that the horizontal extension may extend horizontally obliquely in the upward or downward direction, as well as strictly horizontally. The term "substantially opposite directions" means that the horizontal extensions may extend in respective directions which are obliquely deviated from 180-degree opposite directions, as well as extend in respective directions which are strictly 180-degree opposite. The term "prongs which extend substantially upward" means that the prongs may extend obliquely upward, as well as strictly upward. The term "a substantially vertical direction" may be interpreted to include a direction obliquely deviated from a strictly vertical direction, as well as the strictly vertical direction. The same rule applies hereinafter.

The electrical apparatus as a mounting body may be a video cassette recorder, DVD player, or other electrical apparatuses.

The principle of the invention is applicable to a structure where an electrical apparatus other than a television is fixed to a mounting body, and such a structure is provided by a second aspect of the invention. Namely, the second aspect of the invention provides a structure for fixing an electrical apparatus having an insulated electric wire extending therefrom, to a mounting body, when the electrical apparatus is placed on the mounting body, wherein the mounting body has a hook member around which the insulated electric wire is securely wound so that the electrical apparatus is fixed to the mounting body.

When the electrical apparatus is placed on the mounting body, the insulated electric wire extending from the electrical apparatus is wound around the hook member of the mounting body, so that the electrical apparatus is fixed to the mounting body. That is, the electrical apparatus can be easily fixed to the mounting body by utilizing the insulated electric wire of the electrical apparatus, while eliminating the necessity for providing an additional member such as a belt. Thus, the electrical apparatus is prevented from falling down in the event of an accident such as an earthquake.

The insulated electric wire may be any conducting wire wrapped by an insulator, such as a power cord and earth cable.

According to a first preferred form of the second aspect of the invention, the mounting body is another electrical apparatus. In this arrangement, the electrical apparatus placed on the another electrical apparatus as the mounting body can be fixed to the another electrical apparatus.

This arrangement eliminates the necessity of providing an additional member such as a belt, while facilitates fixing the electrical apparatus placed on the another electrical apparatus, to the another electrical apparatus.

According to a second preferred form of the second aspect of the invention, the another electrical apparatus as the mounting body has a recessed portion on an edge formed by a bottom face and a side face of the another electrical apparatus, and the hook member extends from the recessed portion substantially downward. Since the hook member extends in a direction away from the electrical apparatus placed on the another electrical apparatus, the insulated electric wire is inhibited from coming off from the hook member, thereby the electrical apparatus can be fixed with enhanced reliability.

The side face may be any one of a lateral (right or left) face, a back face or a front face, as seen where a particular side face serves as a front face.

Although the arrangement in which the hook member extends substantially downward from the electrical apparatus is advantageous in that the insulated electric wire is inhibited from coming off from the hook member, the hook member may extend from a side face of the another electrical apparatus as the mounting body, in a direction substantially perpendicular to the side face. In this case, too, the insulated electric wire is securely wound around the hook member, so that the electrical apparatus placed on the another electrical apparatus as the mounting body can be fixed to the another electrical apparatus.

The hook member may have various shapes. One example is given by a third preferred form of the second aspect of the invention, according to which the hook member has an extension which extends from a lower end of the hook member in a direction different from a direction in which the hook member extends from the recessed portion, so that the insulated electric wire securely wound around the hook member is prevented from falling away from the hook member. That is, when the insulated electric wire securely wound around the hook member is moved downward, the insulated electric wire eventually reaches the extension which extends from the lower end of the hook member in the direction different from the direction in which the hook member extends from the recessed portion, thereby making further downward movement of the insulated electric wire impossible, and accordingly preventing the insulated electric wire from falling away.

According to a fourth preferred form of the second aspect of the invention, the extension is constructed such that the extension substantially horizontally extends and has a prong extending substantially upward from an end of the extension. In this arrangement, the insulated electric wire moved toward the end of the extension eventually reaches the prong extending substantially upward, and becomes unable to move further, thereby preventing the insulated electric wire from falling away.

The third and fourth preferred forms of the second aspect of the invention are advantageous in that since the insulated electric wire securely wound around the hook member is prevented from falling away, the insulated electric wire is further positively inhibited from coming off from the hook member and therefore the electrical apparatus can be fixed with enhanced reliability.

According to a fifth preferred form of the second aspect of the invention, the insulated electric wire is a power cord which is noncircular in cross section, a first interval between an upper end of the prong and the recessed portion in a substantially vertical direction is shorter than a maximum dimension of the cross section of the power cord, and larger than a minimum dimension of the cross section of the power cord, and a second interval between a lower end of the prong and the recessed portion in a substantially vertical direction is longer than the maximum dimension of the cross section of the power cord. The power cord can be inserted from the first interval into the corresponding second interval, with being oriented such that a direction of the minimum dimension is substantially vertical. After thus inserted, the orientation of the power code is changed such that a direction of the maximum dimension is substantially vertical. In this state, the power cord is not able to come through the first interval, i.e., between the prong and the recessed portion. Thus, the power cord is inhibited from coming off from the hook member, thereby the electrical apparatus can be fixed with enhanced reliability.

The principle of the invention is also applicable to a structure where two electrical apparatuses each having an insulated electric wire are fixed to each other, and such a structure is provided by a third aspect of the invention. Namely, the third aspect of the invention provides a structure for fixing a first electrical apparatus as a mounting body and a second electrical apparatus placed on the first electrical apparatus, to each other, each of the first electrical apparatus and second electrical apparatus having an insulated electric wire extending therefrom, wherein one of the first electrical apparatus and the second electrical apparatus has a hook member around which the insulated electric wire of the other of the first electrical apparatus and the second electrical apparatus is securely wound, so that the first and second electrical apparatuses are fixed to each other.

When the second electrical apparatus is placed on the first electrical apparatus as the mounting body, the insulated electric wire which extends from one of the first and second electrical apparatuses is securely wound around the hook member of the other of the first and second electrical apparatuses, thereby fixing the two electrical apparatuses to each other. That is, the two electrical apparatuses can be easily fixed to each other by utilizing the insulated electric wire of one of the electrical apparatuses, while eliminating the necessity for providing an additional member such as a belt. Thus, the second electrical apparatus mounted on the first electrical apparatus is prevented from falling down in the event of an accident such as an earthquake.

Modes of the structure where two electrical apparatuses are fixed to each other include at least: a first mode where the second electrical apparatus placed on the first electrical apparatus as a mounting body is fixed to the first electrical apparatus; and a second mode where the first electrical apparatus on which the second electrical apparatus is placed is fixed to the second electrical apparatus.

According to a first preferred form of the third aspect of the invention, the hook member consists of a plurality of hook members which are disposed on respective positions on the one of the first and second electrical apparatuses. This arrangement makes it possible to securely wind an insulated electric wire of various types of electrical apparatuses having an insulated electric wire attached at a position different from type to type, around one of the plurality of hook members which one is located at a position convenient to wind the insulated electric wire, thereby enhancing the user-friendliness of the structure.

According to a second preferred form of the third aspect of the invention, the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction. In this arrangement where the each leg of the electrical apparatus placed on the mounting body is fitted in the one of the at least one dent of the mounting body, the electrical apparatus is inhibited from displacing, thereby further reliably preventing the electrical apparatus from falling down in the event of an accident such as an earthquake.

According to a third preferred form of the third aspect of the invention, the number of the at least one dent is larger than the number of the at least one leg. This arrangement makes it possible to fit each leg of various types of electrical apparatuses having legs attached at positions different from type to type, in one of the dents which one is located at a position convenient to fit in the each leg, thereby enhancing the user-friendliness of the structure.

The gist of the invention also resides in procedures of fixing an electrical apparatus to a mounting body, and such procedures is provided by a fourth aspect of the invention. Namely, the fourth aspect of the invention provides a method of fixing an electrical apparatus having an insulated electric wire extending therefrom, to a mounting body, when the electrical apparatus is placed on the mounting body, comprising steps of: providing the mounting body with a hook member; and securely winding the insulated electric wire around the hook member so that the electrical apparatus is fixed to the mounting body.

According to this fourth aspect of the invention, the same advantage as the second aspect of the invention can be obtained.

Further, a fifth aspect of the invention provides a method of fixing a first electrical apparatus as a mounting body and a second electrical apparatus placed on the first electrical apparatus, to each other, each of the first electrical apparatus and second electrical apparatus having an insulated electric wire extending therefrom, comprising steps of: providing one of the first electrical apparatus and the second electrical apparatus with a hook member; and securely winding the insulated electric wire of the other of the first electrical apparatus and the second electrical apparatus around the hook member, so that the first and second electrical apparatuses are fixed to each other.

According to the fifth aspect, the same advantage as the third aspect can be obtained.

Thus, the invention is applicable to a method of fixing an electrical apparatus, and each of the features respectively defined in the first aspect and each preferred mode of the second and third aspects of the invention, may be applied to each of the fourth and fifth aspects of the invention.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENTS

There will be described in detail preferred embodiments of the invention, by reference to the accompanying drawings.

Figure 1:
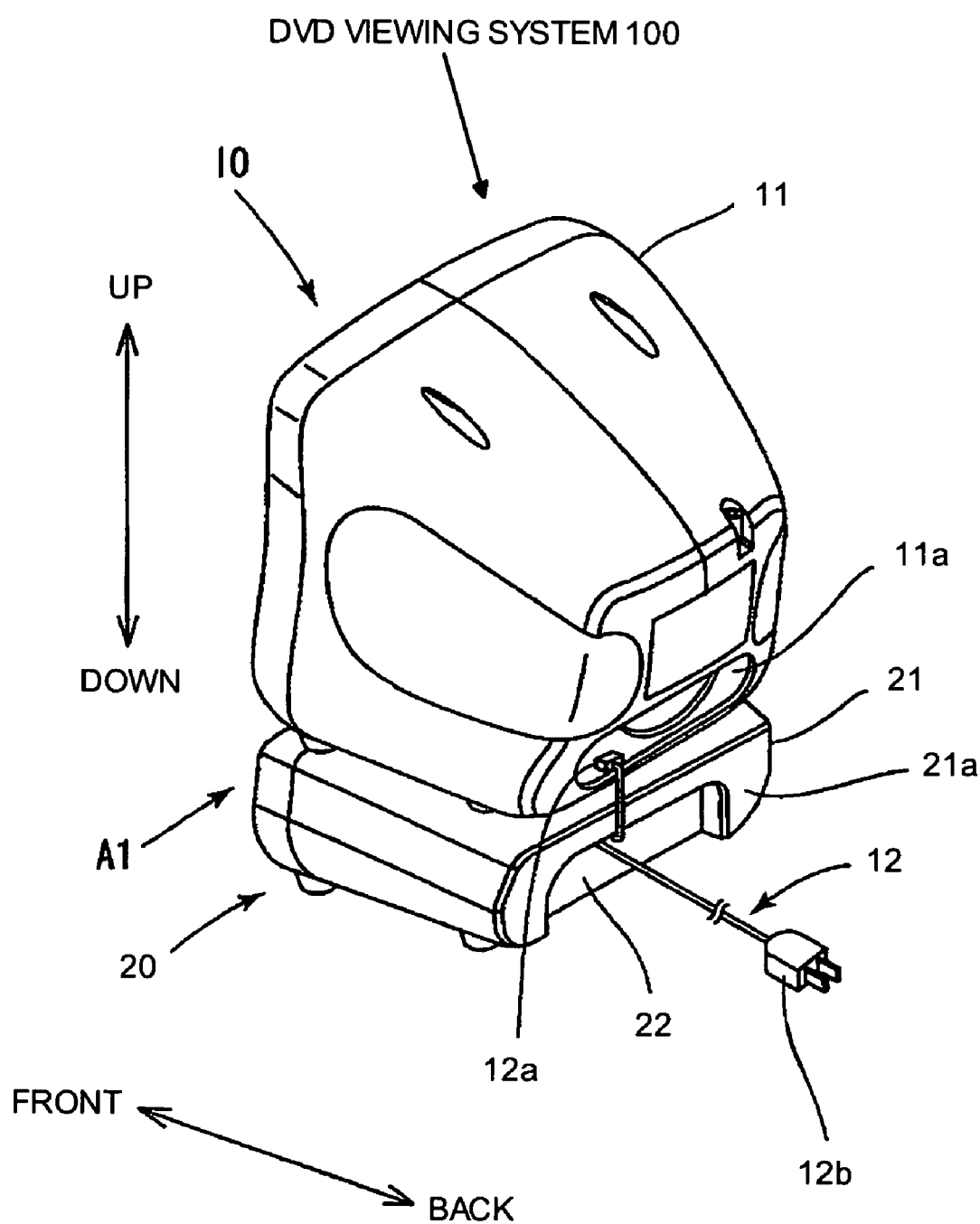
FIG. 1 is a perspective view of a DVD viewing system with a structure for fixing a television according to a first embodiment of the invention.

FIG. 1 is a perspective view (top, right lateral, and back views) of a DVD viewing system 100 to which is applied a structure for fixing a television (structure for fixing an electrical apparatus) according to a first embodiment of the invention. The DVD viewing system 100 comprises a DVD player 20 as an electrical apparatus which serves as a mounting body, and a television (which will be referred to as TV) 10 as an electrical apparatus which is placed on the electrical apparatus as the mounting body. In FIG. 1, the upper left side corresponds to a front side of the system, while the lower right side corresponds to a back side of the system; and the upper and lower sides of FIG. 1 respectively correspond to the upper and lower sides of the system.

The TV 10 is a TV of a relatively small size having a dimension of 19 inches or smaller, and constructed such that a cabinet 11 made of a resin accommodates internal devices including a Braun tube (not shown), a board, and others. A control circuit mounted on the board operates to control relevant devices to receive airwaves, or signals in a predetermined format from the DVD player 20, and to output corresponding video and audio signals to relevant devices. Since a screen of the Braun tube is disposed on the front side of the TV 10, the center of gravity of the TV 10 is located on its front side. Hence, when a vibration is imposed, for instance, in the event of an earthquake, the TV 10 tends to fall down frontward.

The TV 10 has a power cord (insulated electric wire) 12 extending backward (or substantially backward) from a back face 11a of the cabinet 11. The power cord 12 has an equipment end 12a made of a resin and is fixedly attached to the back face 11a of the cabinet. The mechanical strength of the equipment end 12a of the power cord 12 is determined such that the equipment end 12a can bear a given load in a tensile test; for instance, the strength may be such that a main body of the TV 10 can be suspended by the power cord 12.

Figure 2:
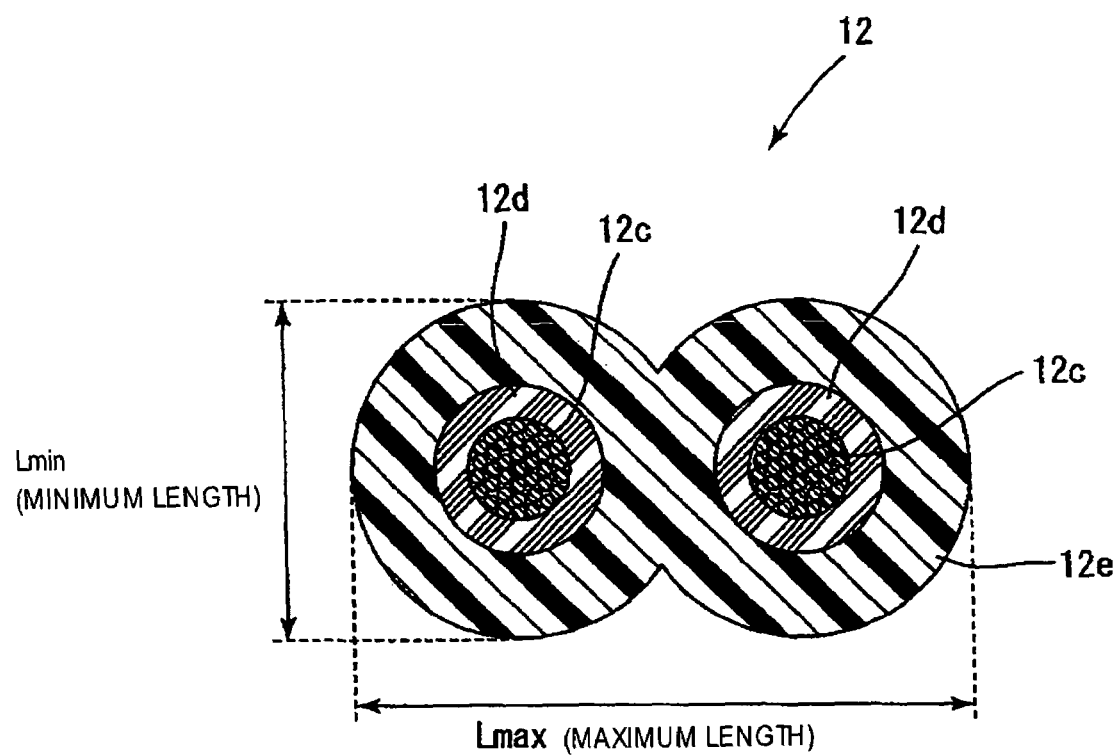
FIG. 2 is a cross sectional view of a power cord.

FIG. 2 shows a cross section of the power cord 12 which is a flat cable as defined by JIS (Japanese Industrial Standards) C3005, namely, a polyvinyl chloride insulated wire for electric equipment where two conducting wires 12c are coated with respective insulators 12d which are covered by a sheath 12e. The cross section of the power cord 12 is noncircular (in the present embodiment, a shape such that two circles are partly overlapped, as shown in FIG. 2), and has a maximum dimension in the left-right direction and has a minimum dimension in the vertical direction, as seen in FIG. 2. The maximum dimension or length of the cross section is represented by Lmax, while the minimum dimension or length is represented by Lmin. A plug 12b is inserted in a household 100V power outlet (not shown) so that an electric power is supplied to the TV 10 via the conducting wires 12c.

The DVD player 20 is constructed such that a cabinet 21 made of a metal accommodates various internal devices including a DVD drive mechanism (not shown) and a board, and others. A control circuit mounted on the board operates to control relevant devices to read recorded signals from a DVD and to output video and audio signals in predetermined formats to the TV 10. In this regard, the DVD player 20 and the TV 10 are connected to each other with an AV cable (not shown), and the video and audio signals outputted from the DVD player 20 are inputted into the TV 10 through the AV cable.

Figure 3:
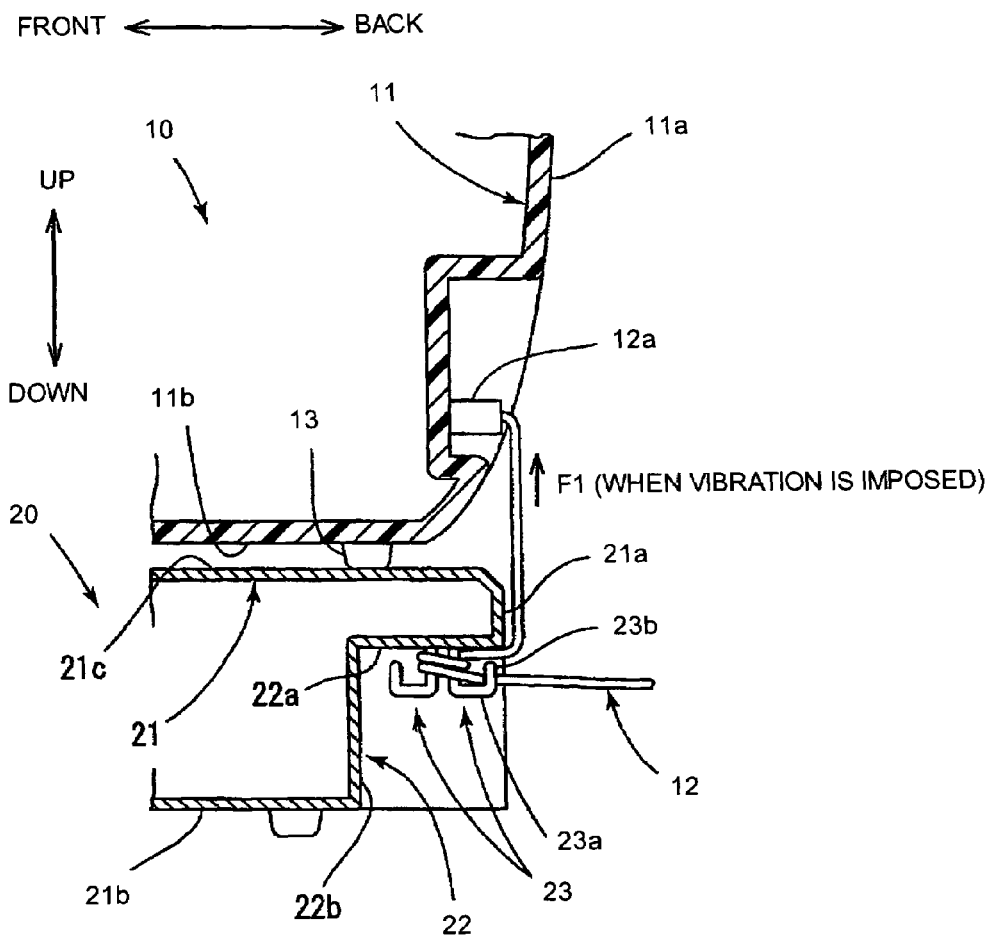
FIG. 3 is a vertical sectional view of the DVD viewing system as seen from the point A1 in FIG. 1.
Figure 3:
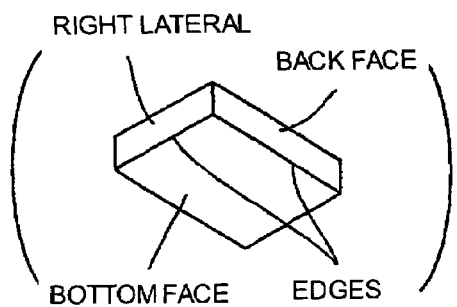
Figure 4:
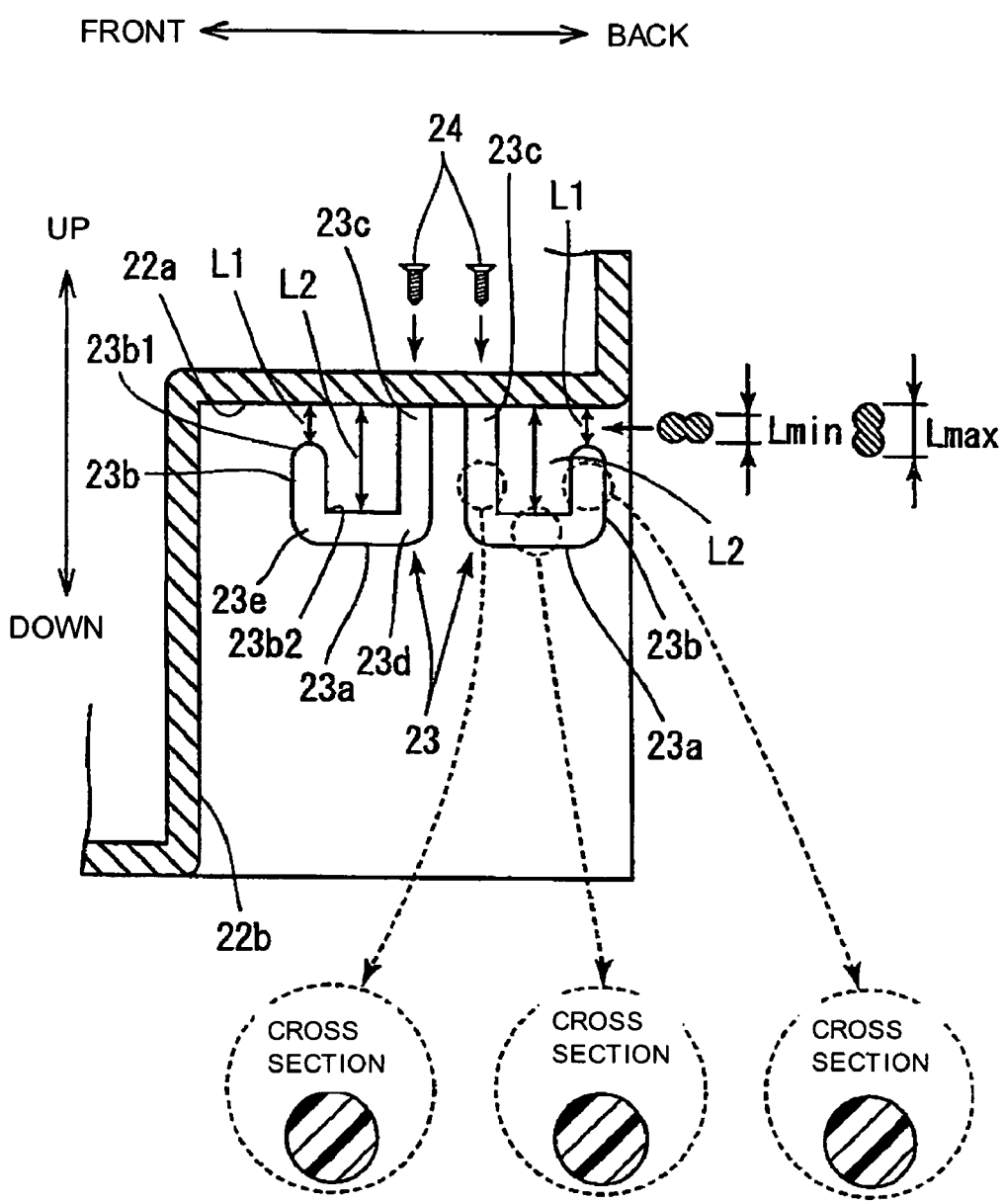
FIG. 4 is a vertical sectional view showing in enlargement a pair of hook members and its vicinity as shown in FIG. 3.

FIG. 3 is a vertical sectional view as seen from point A1 in FIG. 1 and as taken along a line drawn on the immediately hither side of the equipment end of the power cord 12. FIG. 4 is a vertical sectional view showing in enlargement a pair of hook members 23 with its vicinity as shown in FIG. 3, in a state where the power cord 12 is not wound around the pair of hook members 23. To facilitate comprehension, members in the background are partly omitted.

As shown in FIG. 3, a predetermined mounting surface 21c on which the TV 10 to be placed consists of a top face of the cabinet 21 of the DVD player 20. Four rubber legs 13 (only one of which is shown in FIG. 3) are fixed to, and protruding downward (substantially downward) from, a bottom face 11b of the TV 10. The four legs 13 are mounted on the mounting surface 21c of the DVD player 20.

The cabinet 21 of the DVD player 20 has a recessed portion like a partly removed portion, on an edge formed by a bottom face 21b and a back face 21a as one of side faces of the DVD player 20. The term "edge" refers to a line formed where two planes intersect with each other, as schematically shown in the lower side of FIG. 3. Each of the two planes may not necessarily be a plane in the strict sense, but may be a surface which is virtually a plane. The recessed portion 22 has a horizontal surface 22a which is parallel (substantially parallel) to the bottom face 21b of the cabinet 21, and a vertical surface 22b which is parallel (substantially parallel) to the back face 21a of the cabinet 21.

A pair of hook members 23 made of a resin extends downward (substantially downward) from the horizontal surface 22a of the recessed portion 22, such that the power cord 12 can be securely wound around the pair of hook members 23. The hook members 23 have a shape common to each other, which is like a thin column bent twice at right angles (substantially right angles). A proximal portion 23c of each hook member 23 is secured with a screw 24 to the horizontal surface 22a of the recessed portion 22. The power cord 12 of the TV 10 is securely wound around the hook members 23, thereby the TV 10 placed on the DVD player 20 is fixed to the DVD player 20. Thus, the TV 10 is prevented from falling down when a vibration is imposed thereon, for instance, in the event of an earthquake.

Each hook member 23 has an extension 23a which extends from a lower end 23d of the hook member 23 in a direction different from the direction in which the hook member 23 extends from the horizontal surface 22a. The extension 23a serves to prevent the power cord 12 from falling off. In the present embodiment, the hook member 23 on the front side has the extension 23a which extends horizontally (substantially horizontally) and frontward, while the hook member 23 on the rear side has the extension 23a which extends horizontally (substantially horizontally) and backward. In other words, the extensions 23a horizontally (substantially horizontally) extend from the respective lower ends 23d, in respective directions which are opposite (substantially opposite) to each other. According to this arrangement, when the power cord 12 wound around the hook members 23 moves downward, the power cord 12 is eventually brought into contact with the extensions 23a which extend in directions different from the downward extending direction of the hook members 23, and thus made unable to move any further down. Thus, the extensions 23a prevent the power cord 12 wound around the hook members 23 from falling off. Therefore, the power cord 12 is inhibited from coming off from the hook members 23, thereby enabling the TV 10 to be fixed to the DVD player 20 with reliability.

Further, each extension 23a has a prong 23b which extends upward (substantially upward) from an end 23e of the extension 23a. That is, when the power cord 12 securely wound around the hook members 23 moves toward the prong 23b, the power cord 12 is eventually brought into contact with the prong 23b and made unable to move any further. Thus, the prongs 23b also serve to prevent the power cord 12 wound around the hook members 23 from falling down, inhibiting the power cord 12 from coming off from the hook members 23. Consequently, the TV 10 can be fixed to the DVD player 20 with reliability.

An interval L1 in the vertical direction (substantially vertical direction) between an upper end 23b1 of the prong 23b and the horizontal surface 22a of the recessed portion 22 is smaller than a maximum dimension or length Lmax of the cross section of the power cord 12, as well as larger than a minimum dimension or length Lmin of the cross section of the power cord 12. Therefore, when the TV 10 is placed on the DVD player 20, the power cord 12 is inserted from the interval between the prong 23b and the horizontal surface 22a of the recessed portion 22, with the power cord 12 held in an orientation where the minimum dimension of the power cord 12 is oriented in the vertical direction, into the interval between the extension 23a and the horizontal surface 22a of the recessed portion 22.

Since the pair of hook members 23 is made of a resin and therefore flexible to some extent, the power cord 12 may be inserted from the interval between the extension 23a and the horizontal surface 22a with and by being flexibly deformed.

A length of an interval in the vertical direction (substantially vertical direction) between a lower end 23b2 of the prong 23b and the horizontal surface 22a of the recessed portion 22 is larger than the maximum dimension or length Lmax of the cross section of the power cord 12. After the power cord 12 is inserted into the interval between the extension 23a and the horizontal surface 22a, the direction of the maximum dimension of the power cord 12 is oriented vertically, so as to make the power cord 12 unable to come through the interval between the prong 23b and the horizontal surface 22a. That is, the power cord 12 is inhibited from coming off from the hook members 23.

Figure 5:
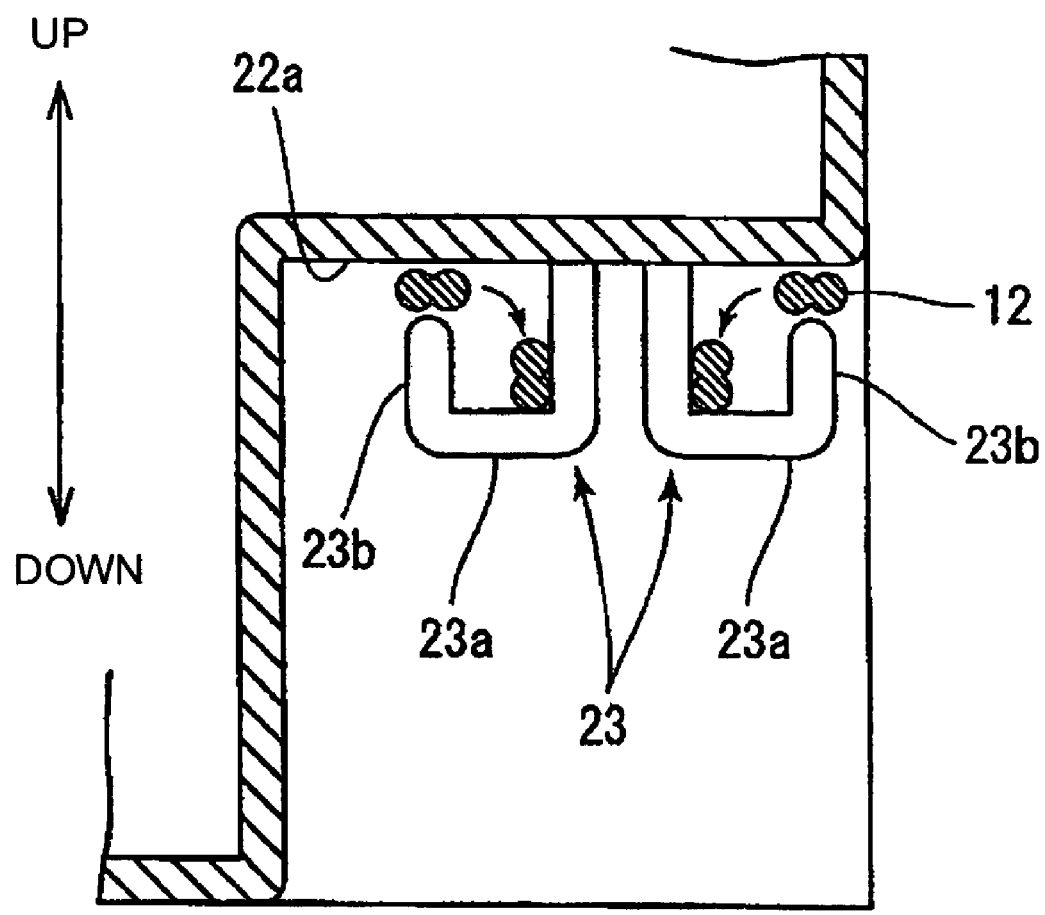
FIG. 5 is a schematic view illustrating how the power cord is securely wound around the hook member.

As shown in FIG. 5, to have the power cord 12 securely wound around the pair of hook members 23, the power cord 12 is entwined around the pair of the hook members 23 by sequentially being inserted from one of the two intervals between the respective extensions 23a of the two hook members 23 disposed in alignment in the front-rear direction and the horizontal surface 22a, while the orientation of the power cord 12 being changed appropriately, such that the power cord 12 is securely wound around the pair of hook members 23. Since the pair of hook members 23 is made of a resin, a distance between the two hook members 23 is reduced when the power cord 12 is tightly wound around the pair of hook members 23, thereby a force to restore an original distance is generated in the hook members 23. Therefore, the wound power cord 12 does not easily come loose, contributing to inhibit the power cord 12 from coming off from the hook members 23.

Thus, the TV 10 is fixed to the DVD player 20 by inserting the power cord 12 from between the prong 23b and the recessed portion 22 and into the interval between the extension 23a and the recessed portion 22 to securely wind the power cord 12 around the pair of hook members 23.

The number of turns of the power cord 12 may be any, as long as the power cord 12 can be inserted between the prong 23b and the horizontal surface 22a of the recessed portion 22. The power cord 12 may be wound only with one turn around the hook members 23, or, wound with several turns until the power cord 12 come to unable to be inserted deep into the interval between the extension 23a and horizontal surface 22a any more and thus remains between the prong 23b and the horizontal surface 22a.

There will next be described operation of the structure for fixing a television.

As described above, the TV 10 is placed on the mounting surface 21c of the DVD player 20 and the power cord 12 is wound around the pair of hook members 23, so as to fix the TV 10 to the DVD player 20. Thus, the TV 10 can be easily fixed to the DVD player 20 with utilizing the power cord 12 of the TV 10, while eliminating necessity of separately providing a member such as a belt, band or buckle.

In the case where a vibration such as an earthquake is imposed on the DVD viewing system 100, a force to cause the TV 10 on the DVD player 20 to fall frontward is imposed on the TV 10, since the center of gravity of the TV 10 is located on its front side. Then, an upward tensile force F1 as shown in FIG. 3 is applied to the power cord 12 fixing the TV 10 to the DVD player 20. The power cord 12 which is wound around the hook members 23 of the DVD player 20 does not move upward even when the upward force F1 is applied. Consequently, the TV 10 does not fall frontward but is held fixed to and mounted on the upper surface of the DVD player 20.

Even in a case where a horizontal force is imposed on the TV 10, the TV 10 substantially does not slip sideways, since the power cord 12 of the TV 10 is wound around the hook members 23 of the DVD player 20. This also contributes to prevent the TV 10 from falling down from the DVD player 20.

The power cord 12 has the equipment end 12a which is made of a resin and has the strength such that the equipment end 12a can bear the given load in a tensile test, e.g., such that the main body of the TV 10 can be suspended by the power cord 12, and is fixedly attached to the back face 11a of the cabinet 11. Hence, even if the vibration such as an earthquake is imposed on the TV 10, the power cord 12 is not easily cut off or plucked away from the main body of the TV 10.

The thus utilizing the power cord 12 of the TV 10 facilitates fixing the TV 10 to the electrical apparatus as the mounting body, without requiring an additional member such as a belt, band or buckle, so as to prevent the TV 10 from falling down in the event of an accident such as an earthquake.

Further, since the pair of hook members 23 extend downward (substantially downward) away from the TV 10 as mounted on the electrical apparatus as the mounting body, the power cord 12 does not easily come off from the hook members 23, enabling to fix the TV 10 to the electrical apparatus with reliability.

Although in the above-described embodiment the mounting body on which the TV 10 is placed is the DVD player 20, the mounting body may be other electrical apparatuses such as a video cassette recorder, or may be a stand such as a TV stand on which the TV 10 can be placed. On the other hand, the electrical apparatus which is mounted on the mounting body is not limited to a TV, but may be a DVD player, video cassette recorder, etc. Where a structure for fixing these electrical apparatuses is provided, a power cord of an electrical apparatus placed on another electrical apparatus as a mounting body is utilized for easily fixing the electrical apparatus to the another electrical apparatus as the mounting body, while eliminating necessity of providing an additional member such as a belt.

Since a DVD player also has a power cord extending from its cabinet, the DVD and a TV may be fixed to each other by utilizing the power cord of the DVD, as in a second embodiment of the invention.

Figure 6:
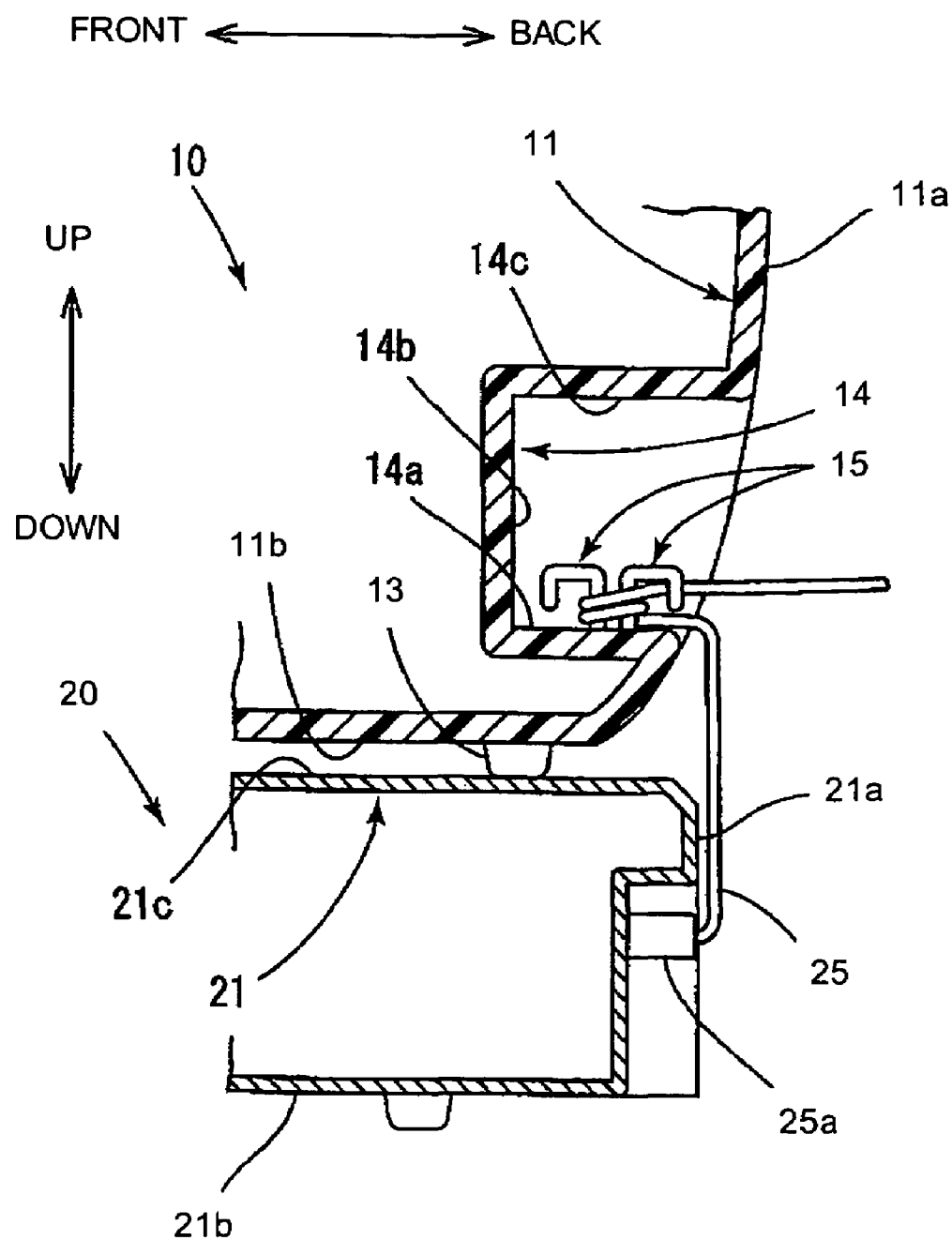
FIG. 6 is a vertical sectional view of a DVD viewing system with a structure for fixing a television according to a second embodiment of the invention.

FIG. 6 is a vertical sectional view showing in cross section a DVD viewing system according to the second embodiment of the invention.

As shown in FIG. 6, the DVD player 20 has a power cord (insulated electric wire) 25 extending backward (substantially backward) from the back face 21a of the cabinet 21. An equipment end 25a of the power cord 25 is made of a resin and fixedly attached the back face 21a.

On the other hand, in the back face 11a of the cabinet of the TV 10 as an electrical apparatus placed on the DVD player 20, there is formed a recessed portion 14 like a hollow dug in the back face 11a in the frontward (substantially frontward) direction. The recessed portion 14 has a horizontal surface 14a, 14c, which is parallel (substantially parallel) to the bottom face 11b of the cabinet 11, and a vertical surface 14b which is parallel (substantially parallel) to the back face 11a of the cabinet 11. The horizontal surfaces 14a, 14c are opposed to each other, the horizontal surface 14a being on the lower side while the horizontal surface 14c being on the upper side.

The recessed portion 14 has a pair of hook members 15 which is made of a resin and which extends from the horizontal surface 14a upward (substantially upward), such that the power cord 25 can be securely wound around the pair of hook members 15. The hook members 25 have a shape identical with the hook members 23.

To have the power cord 25 of the DVD player securely wound around the pair of hook members 15, the power cord 25 is entwined around the pair of the hook members 15 while the orientation of the power cord 25 being sequentially changed appropriately. In the second embodiment, the power cord 25 is securely wound around the hook members 15 so as to fix the TV 10 and the DVD player 20 to each other.

As apparent from the above description, the power cord of the electrical apparatus as the mounting body can be utilized to easily fix the two electrical apparatuses without requiring an additional member such as a belt, and thereby to prevent the mounted electrical apparatus from falling down in the event of an accident such as an earthquake. In particular, in a case where it is difficult to wind a power cord of a TV around a relevant member of an electrical apparatus as the mounting body, the present structure is advantageously employed to securely wind the power cord of the mounting body around the hook member or members of the another electrical apparatus so that the two apparatuses can be fixed to each other.

It is also feasible to arrange such that the power cord of the TV is wound around the hook member or members of the DVD player as well as the power cord of the DVD player is wound around the hook member or members of the TV, to fix the TV and DVD player to each other. According to this arrangement, the two electrical apparatuses are further reliably fixed to each other, enabling to prevent the mounted electrical apparatus from falling down.

The power cord may be replaced by any other insulated electric wire such as an earth cable, antenna wire or signal wire.

A dent in which the leg 13 of the TV 10 is fitted may be formed in the mounting surface of the DVD player 20, as in a third embodiment of the invention.

Figure 7:
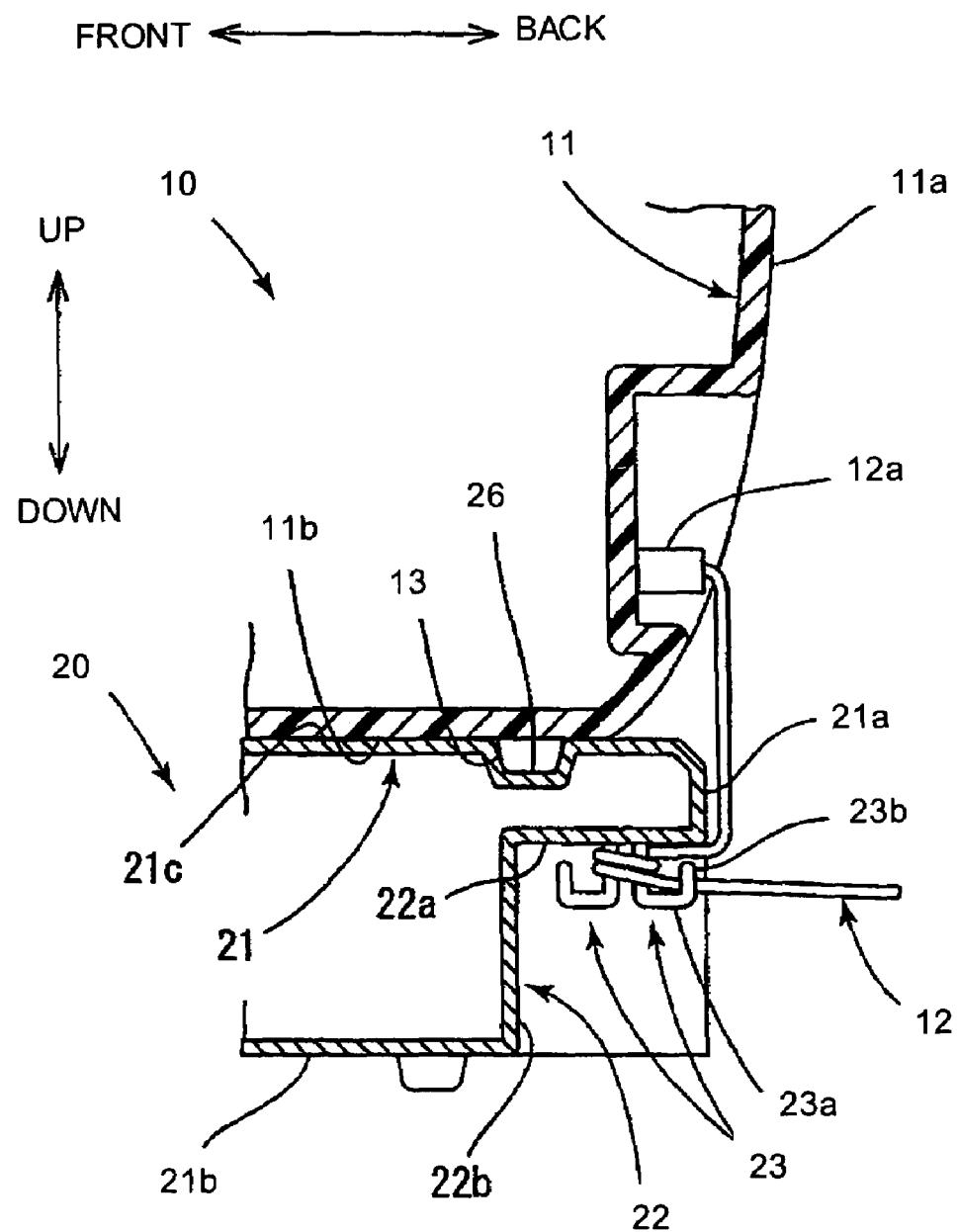
FIG. 7 is a vertical sectional view of a DVD viewing system with a structure for fixing a television according to a third embodiment of the invention.

FIG. 7 is a vertical sectional view showing in cross section a DVD viewing system according to the third embodiment of the invention. The elements corresponding to those in the first embodiment shown in FIG. 3 are referred to by the same reference numerals and description thereof is omitted.

As shown in FIG. 7, in a predetermined mounting surface 21c of the DVD player 20, a dent 26 is formed such that the dent is sunken downwardly (substantially downwardly) so that the leg 13 of the TV 10 can be fitted in the dent 26. Although only one dent 26 is shown in FIG. 7, four dents 26 for the four legs 13 of the TV are formed at respective locations corresponding to the positions of the legs 13. The TV 10 is properly positioned on the DVD player 20 by fitting the four legs 13 projecting downward from the bottom face 11b of the TV 10 in the four dents 26, respectively.

According to this arrangement where the legs of the TV placed on the electrical apparatus as the mounting apparatus are fitted in the dents of the electrical apparatus, the TV is inhibited from moving on the electrical apparatus, thereby preventing the TV from falling down in the event of suffering from vibration such as an earthquake, with enhanced reliability.

Figure 8:
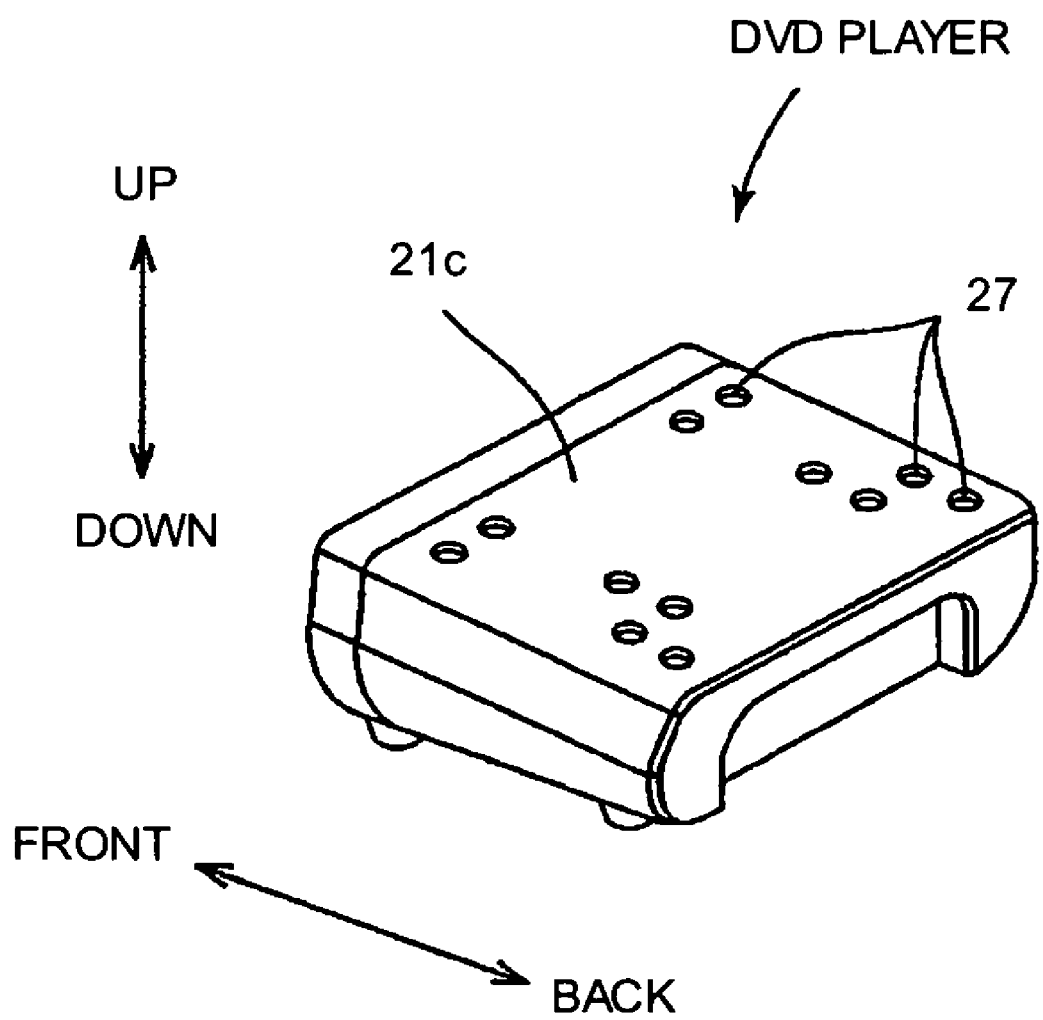
FIG. 8 is a perspective view of a DVD player with which a structure for fixing a television according to a fourth embodiment of the invention is constructed.

FIG. 8 shows a DVD player according to a fourth embodiment of the invention, where the number of dents is larger than that of legs of the TV. Namely, the number of dents 27 formed in the mounting surface 21c of the DVD player is larger than four which is the number of the legs of the TV. Hence, a variety of types of TVs having legs located at positions which are different from type to type, can be placed on the DVD player with each of the legs fitted in one of the multiple dents located at a convenient position. Thus, the user-friendliness is enhanced.

Although the arrangement where the hook members extend downward from the electrical apparatus as the mounting body is advantageous in that the power cord is inhibited from coming off from the hook members, the hook members may extend from a side face of the electrical apparatus as the mounting body, in a direction substantially perpendicular to the side face, as in a fifth embodiment of the invention.

Figure 9:
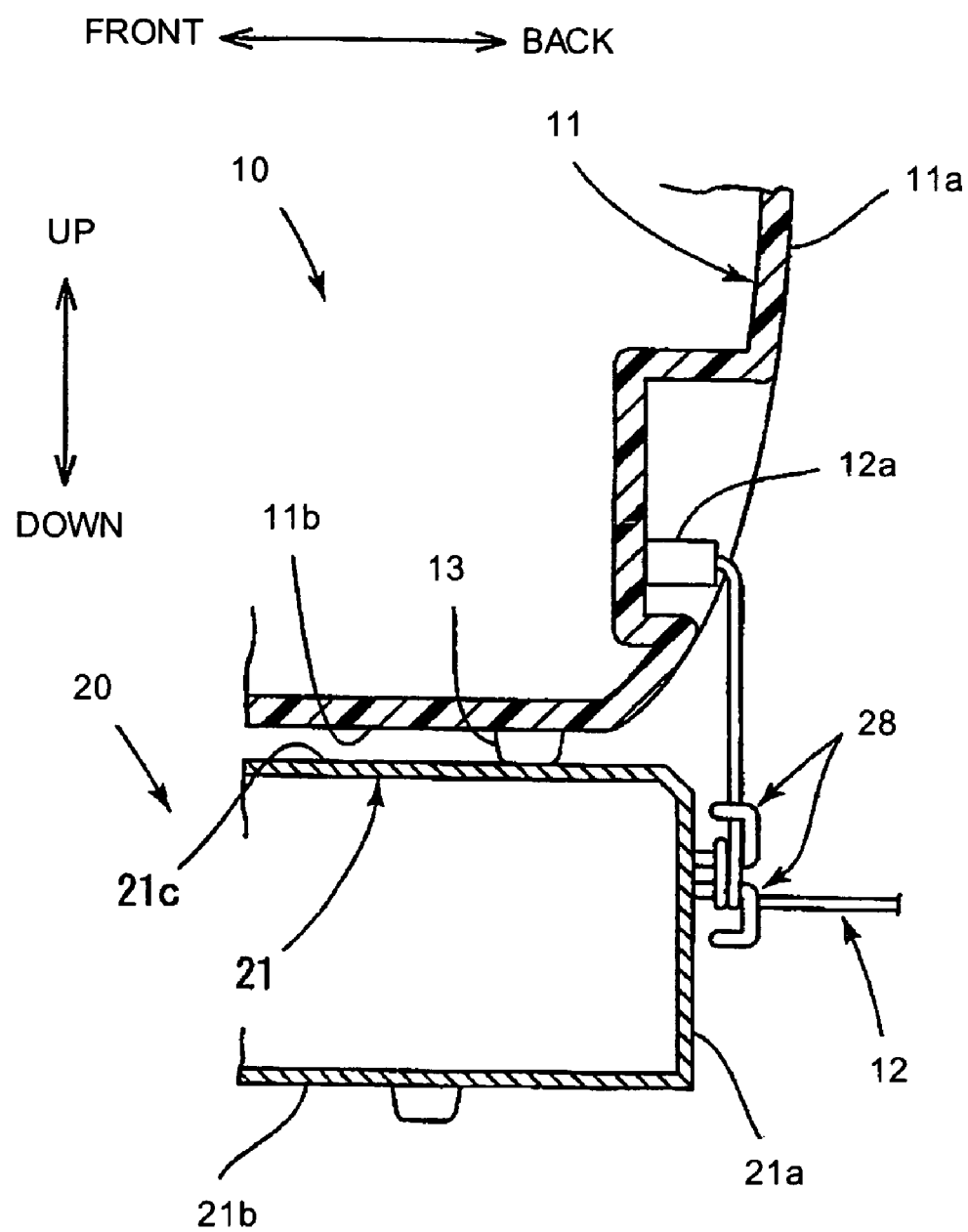
FIG. 9 is a vertical sectional view of a DVD viewing system with a structure for fixing a television according to a fifth embodiment of the invention.

FIG. 9 is a vertical sectional view showing in cross section a DVD viewing system with a structure for fixing a television according to the fifth embodiment of the invention. The elements corresponding to those in the first embodiment shown in FIG. 3 are referred to by the same reference numerals and description thereof is omitted.

As shown in FIG. 9, the DVD player 20 has a pair of hook members 28 which are made of a resin and extend backward (substantially backward) from the back face 21a, and around which the power cord 12 can be wound. The hook members 28 have a shape identical with the hook members 23.

To have the power cord 12 of the TV 10 securely wound around the pair of hook members 28, the power cord 12 is entwined around the pair of the hook members 28 disposed in alignment in the vertical direction, while the orientation of the power cord 12 being sequentially changed appropriately.

That is, even in the arrangement where the hook members are disposed such that the hook members extend backward from the back face of the DVD player, the power cord can be securely wound around the hook members so that the TV placed on the electrical apparatus as the mounting body is fixed to the electrical apparatus as the mounting body.

The fifth embodiment may be modified such that the recessed portion 22 is formed on the DVD player, not on the TV, and the hook members extend backward from the vertical surface 22b of the recessed portion 22. In this arrangement, the hook members do not project beyond the back face of the DVD player, eliminating the inconvenience that the hook members obstruct putting the DVD player in place.

The hook members around which the power cord is wound may take various forms. For instance, the hook members may not have the prongs 23b. Even in this case, the power cord 12 can be securely wound around the hook members.

Figure 10:
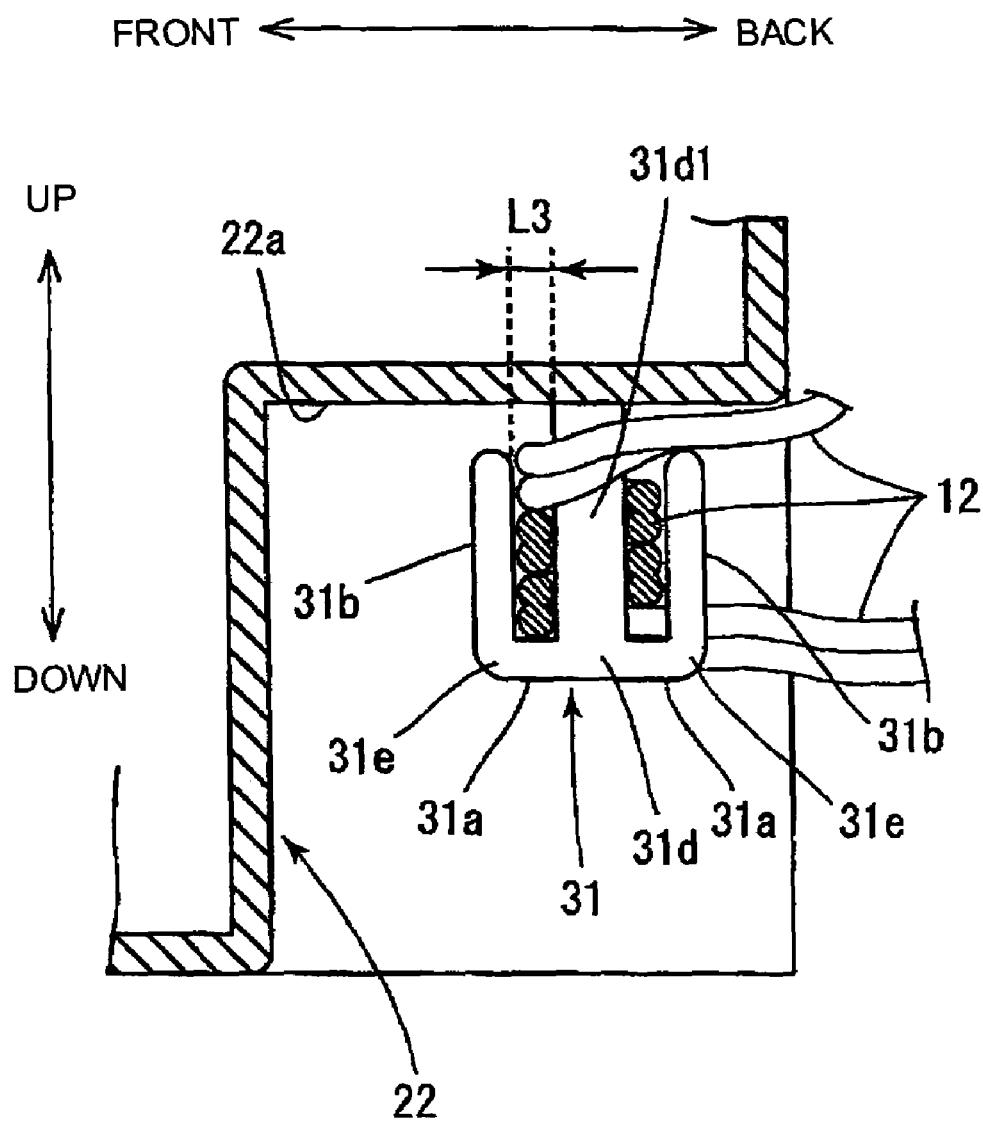
FIG. 10 is a side elevational view of a hook member in a structure for fixing a television according to a sixth embodiment of the invention.

FIG. 10 shows a hook member 31 of a structure for fixing a television according to a sixth embodiment of the invention. To facilitate comprehension, part of the power cord wound around the hook member 31 is shown in cross section.

The recessed portion 22 of the DVD player has the hook member 31 consisting of a single member which extend downward (substantially downward) from the horizontal surface 22a and around which the power cord 12 can be wound. The hook member 31 has two extensions 31a which respectively extend horizontally (substantially horizontally) from a lower end 31d of the hook member 31 in respective directions opposite (substantially opposite) to each other, namely, frontward and backward directions. Each of the extensions 31a has a prong 31b extending upward (substantially upward) from an end 31e of the extension 31a. With operation similar to that of the hook members 23, the power cord 12 is inhibited from coming off from the hook member 31, thereby fixing the TV to the DVD player with reliability.

An interval between a lower end of the prong 31b of the hook member 31 and the horizontal surface 22a of the recessed portion is determined such that the power cord 12 can be wound around the hook member 31 with a plurality of turns with being oriented such that the maximum dimension of the cross section of the power cord 12 is oriented vertically (substantially vertically). A length L3 between the center 31d1 of the hook member 31 in the front-rear direction (substantially front-rear direction) and the prong 31b is larger than the minimum dimension or length Lmin of the cross section of the power cord 12 and smaller than the maximum dimension or length Lmax of the cross section of the power cord 12. Therefore, the power cord 12 is wound around the hook member 31 with the maximum dimension of its cross section oriented vertically. That is, the power cord 12 is securely wound around the hook member 31 in an orderly manner with the maximum dimension of the cross section of the power cord 12 held oriented vertically, thereby enabling to securely wind the power cord around the hook member with improved reliability so as to fix the TV to the electrical apparatus as the mounting body.

Figure 11:
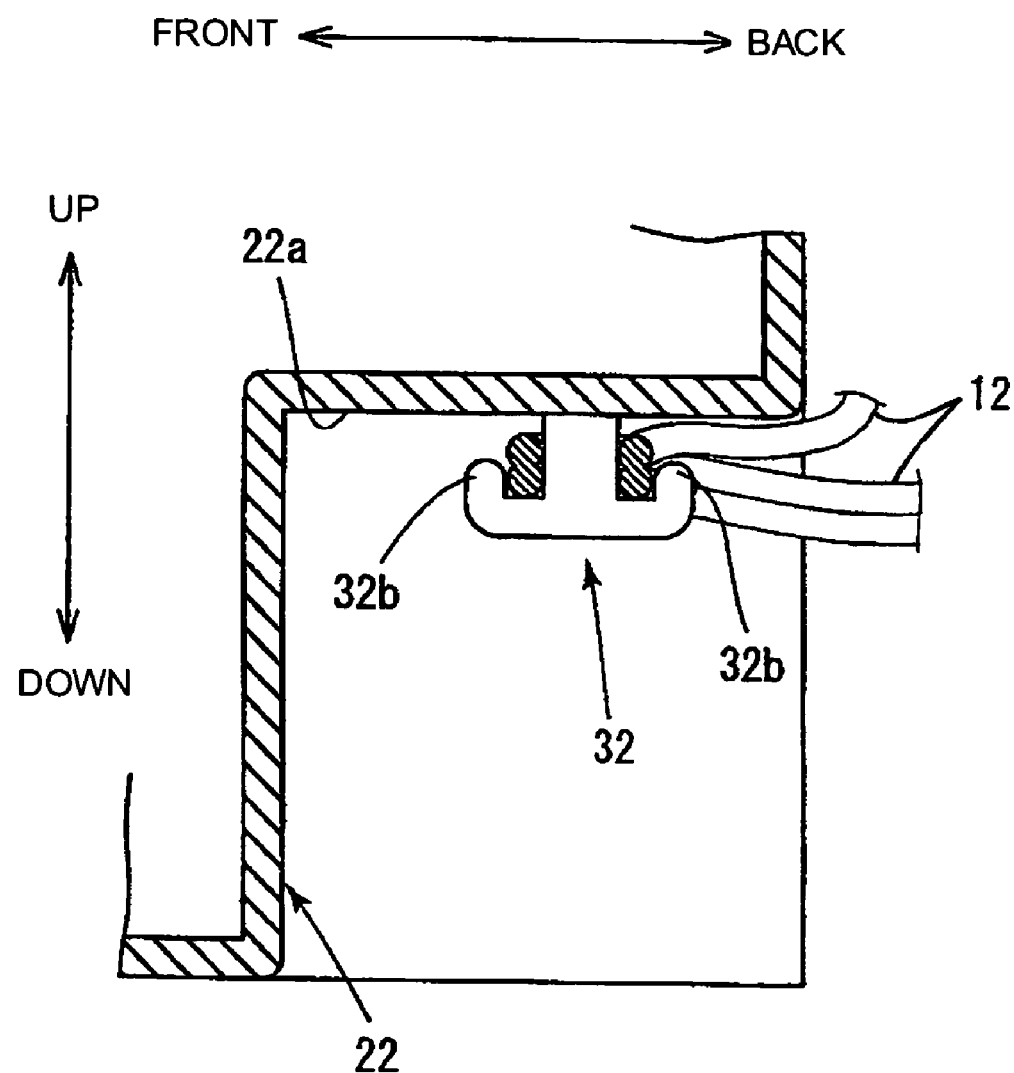
FIG. 11 is a side elevational view of a hook member in a structure for fixing a television according to a seventh embodiment of the invention.

A structure for fixing a television according to a seventh embodiment of the invention is shown in FIG. 11. In this fixing structure, the interval between the lower end of the prong 32b and the horizontal surface 22a of the recessed portion 22 is determined such that the power cord 12 can be wound around the hook member 32 with only one turn, while the maximum dimension of the power cord 12 being oriented vertically (substantially vertically). In FIG. 11, the power cord wound around the hook member 32 is shown in cross section for easy understanding. Although according to this arrangement the force for holding the power cord 12 is weakened, the TV can be fixed to the electrical apparatus as the mounting body with a simple step of winding the power cord 12 around the hook member 31 with only one turn.

Figure 12:
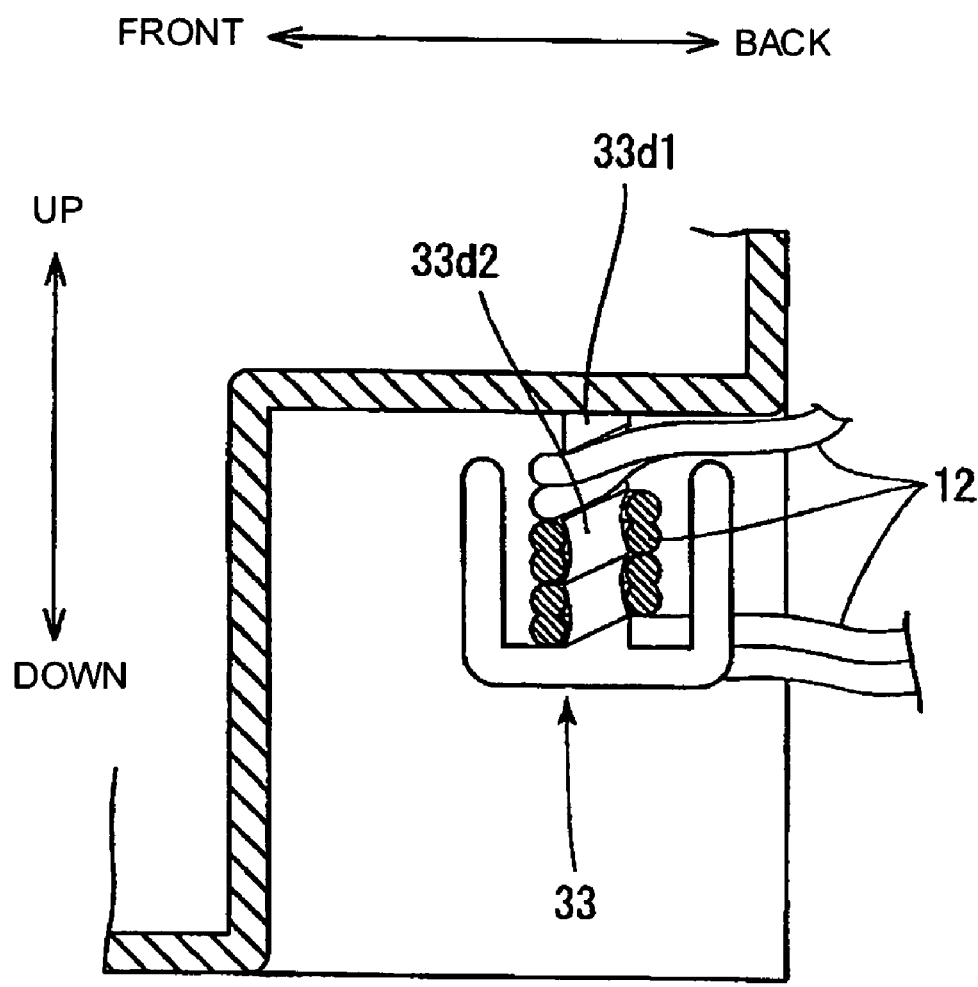
FIG. 12 is a side elevational view of a hook member in a structure for fixing a television according to an eighth embodiment of the invention.

A television fixing structure according to an eighth embodiment of the invention is shown in FIG. 12. In this structure, the hook member 33 has a helical groove 33d2 having a shape corresponding to that of the power cord 12 so as to fit the power cord 12. To facilitate comprehension, part of the power cord wound around the hook member 33 is shown in cross section. The helical groove 33d2 is formed on the outer circumferential surface of a center part 33d1 of the hook member 33. The vertical length or width of the groove 33d2 is substantially the same as the maximum dimension of the cross section of the power cord 12, so that the part of the power cord 12 can be fitted in the groove 33d2 with the maximum dimension of the cross section of the power cord 12 oriented vertically (substantially vertically).

Since when the power cord 12 is wound around the center part 33d1 of the hook member with the maximum dimension of the cross section of the power cord 12 oriented vertically, part of the power cord 12 is fitted in the groove 33d2, the power cord 12 can be firmly wound around the hook member 33 along the groove 33d2. Fitted in the groove 33d2, the power cord 12 does not easily displaced from the position where it is wound. Hence, the power cord is securely wound around the hook member with enhanced reliability, to fix the TV to the electrical apparatus as the mounting body.

Figure 13:
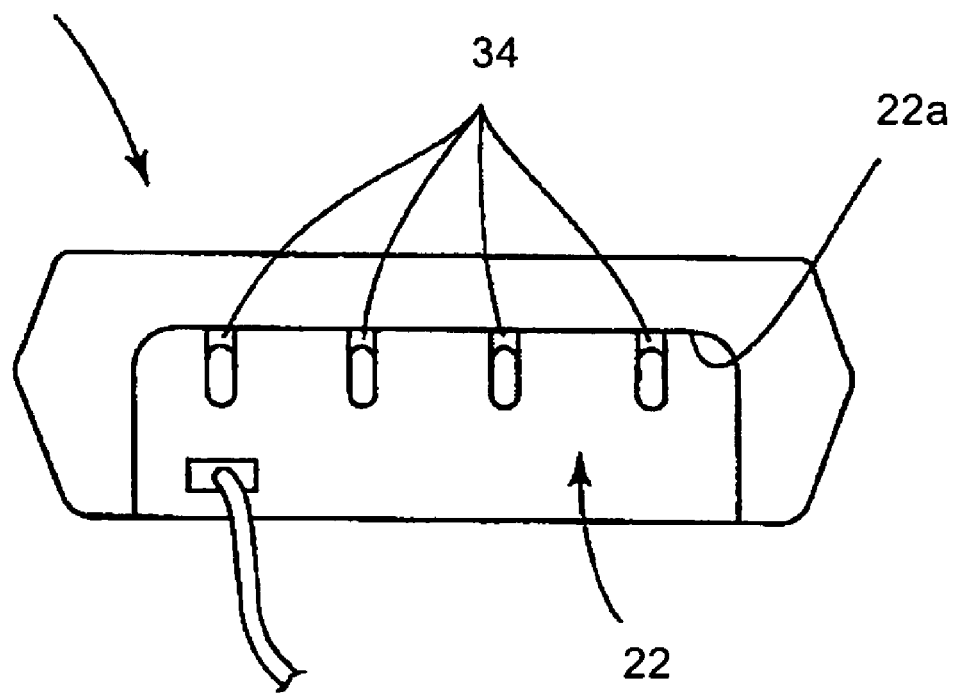
FIG. 13 is a rear view of a DVD player with which a structure for fixing a television according to a ninth embodiment of the invention is constructed.

Referring now to FIG. 13, there is shown a back view of a DVD player to which a structure for fixing a television according to a ninth embodiment of the invention is applied. In the fixing structure, the hook member around which the power cord is wound consists of a plurality of hook members which are located at respective positions on the electrical apparatus as the mounting body.

A recessed portion 22 of the DVD player has a plurality of hook members 34 which extend downward (substantially downward) from a horizontal surface 22a and around each of which the power cord of the TV can be wound. More specifically, the power cord of the TV is entwined around any one of the plurality of the hook members 34 so that the power cord is held securely wound around the one hook member around which the power cord is entwined. Consequently, it is made possible to fix various types of TVs which have a power cord at an attaching position different from type to type, to the DVD player, such that the power cord is wound around one of the hook members which one is located at a position convenient to wind the power cord, thereby enhancing the user-friendliness.

As apparent from the above description of the preferred embodiments, the invention provides a structure for fixing an electrical apparatus such as a television, which enables easily fixing an electrical apparatus to a mounting body without requiring an additional member such as a belt, to prevent the electrical apparatus from falling down in the event of suffering from vibration such as an earthquake. Further, the invention is applicable to a method of fixing an electrical apparatus as well.

Further, while the preferred embodiments of the present invention have been described above, for illustrative purpose only, it is to be understood that the invention may be embodied with various changes and improvements, which may occur to those skilled in the art.

What is claimed is:

1. A structure for fixing an electrical apparatus having an insulated electric wire extending therefrom, to a mounting body, when the electrical apparatus is placed on the mounting body, wherein
the mounting body has a hook member around which the insulated electric wire is securely wound so that the electrical apparatus is fixed to the mounting body; and
the hook member has an extension which extends from a lower end of the hook member in a direction different from a direction in which the hook member extends, so that the insulated electric wire securely wound around the hook member is prevented from falling away from the hook member.

2. The structure according to claim 1, wherein the mounting body is another electrical apparatus.

3. The structure according to claim 2, wherein the another electrical apparatus as the mounting body has a recessed portion on an edge formed by a bottom face and a side face of the another electrical apparatus, and the hook member extends from the recessed portion substantially downward.

4. The structure according to claim 1, wherein the extension is constructed such that the extension substantially horizontally extends and has a prong extending substantially upward from an end of the extension.

5. The structure according to claim 4,
wherein the insulated electric wire is a power cord which is noncircular in cross section,
wherein a first interval between an upper end of the prong and the recessed portion in a substantially vertical direction is shorter than a maximum dimension of the cross section of the power cord, and larger than a minimum dimension of the cross section of the power cord,
and wherein a second interval between a lower end of the prong and the recessed portion in a substantially vertical direction is longer than the maximum dimension of the cross section of the power cord.

6. A structure for fixing a first electrical apparatus as a mounting body and a second electrical apparatus placed on the first electrical apparatus, to each other, each of the first electrical apparatus and second electrical apparatus having an insulated electric wire extending therefrom,
wherein one of the first electrical apparatus and the second electrical apparatus has a hook member around which the insulated electric wire of the other of the first electrical apparatus and the second electrical apparatus is securely wound, so that the first and second electrical apparatuses are fixed to each other; and
the hook member has an extension which extends from a lower end of the hook member in a direction different from a direction in which the hook member extends, so that the insulated electric wire securely wound around the hook member is prevented from falling away from the hook member.

7. The structure according to claim 2, wherein the hook member consists of a plurality of hook members which are disposed on respective positions on the one of the first and second electrical apparatuses.

8. The structure according to claim 3, wherein the hook member consists of a plurality of hook members which are disposed on respective positions on the relevant one of the first and second electrical apparatuses.

9. The structure according to claim 1, wherein the hook member consists of a plurality of hook members which are disposed on respective positions on the relevant one of the first and second electrical apparatuses.

10. The structure according to claim 4, wherein the hook member consists of a plurality of hook members which are disposed on respective positions on the relevant one of the first and second electrical apparatuses.

11. The structure according to claim 5, wherein the hook member consists of a plurality of hook members which are disposed on respective positions on the relevant one of the first and second electrical apparatuses.

12. The structure according to claim 6, wherein the hook member consists of a plurality of hook members which are disposed on respective positions on the relevant one of the first and second electrical apparatuses.

13. The structure according to claim 1, the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

14. The structure according to claim 7, wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

15. The structure according to claim 8, wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

16. The structure according to claim 9, wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

17. The structure according to claim 10 wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

18. The structure according to claim 11, wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

19. The structure according to claim 12, wherein the second electrical apparatus, which is placed on the first electrical apparatus as the mounting body, has at least one leg protruding substantially downward from the bottom face thereof, and the first electrical apparatus has at least one dent formed in a predetermined mounting surface on which the second electrical apparatus having the at least one leg is placed, each of the at least one leg being fitted in one of the at least one dent in a substantially downward direction.

20. The structure according to claim 13, wherein the number of the at least one dent is larger than the number of the at least one leg.

21. The structure according to claim 14, wherein the number of the at least one dent is larger than the number of the at least one leg.

22. The structure according to claim 15, wherein the number of the at least one dent is larger than the number of the at least one leg.

23. The structure according to claim 16, wherein the number of the at least one dent is larger than the number of the at least one leg.

24. The structure according to claim 17, wherein the number of the at least one dent is larger than the number of the at least one leg.

25. The structure according to claim 18, wherein the number of the at least one dent is larger than the number of the at least one leg.

26. The structure according to claim 19, wherein the number of the at least one dent is larger than the number of the at least one leg.

27. A method of fixing an electrical apparatus having an insulated electric wire extending therefrom, to a mounting body, when the electrical apparatus is placed on the mounting body, comprising steps of:

providing the mounting body with a hook member that has an extension which extends from a lower end of the hook member in a direction different from a direction in which the hook member extends so that the insulated electric wire securely wound around the hook member is prevented from failing away from the hook member; and securely winding the insulated electric wire around the hook member so that the electrical apparatus is fixed to the mounting body.

28. A method of fixing a first electrical apparatus as a mounting body and a second electrical apparatus placed on the first electrical apparatus, to each other, each of the first electrical apparatus and second electrical apparatus having an insulated electric wire extending therefrom, comprising steps of:

providing one of the first electrical apparatus and the second electrical apparatus with a hook member that has an extension which extends from a lower end of the hook member in a direction different from a direction in which the hook member extends so that the insulated electric wire securely wound around the hook member is prevented from failing away from the hook member; and securely winding the insulated electric wire of the other of the first electrical apparatus and the second electrical apparatus around the hook member, so that the first and second electrical apparatuses are fixed to each other.

* * * * *